G. R. KING & S. W. FANCHER.
BAG FILLING MACHINE.
APPLICATION FILED FEB. 5, 1914.
1,124,459.
Patented Jan. 12, 1915.
2 SHEETS—SHEET 1.
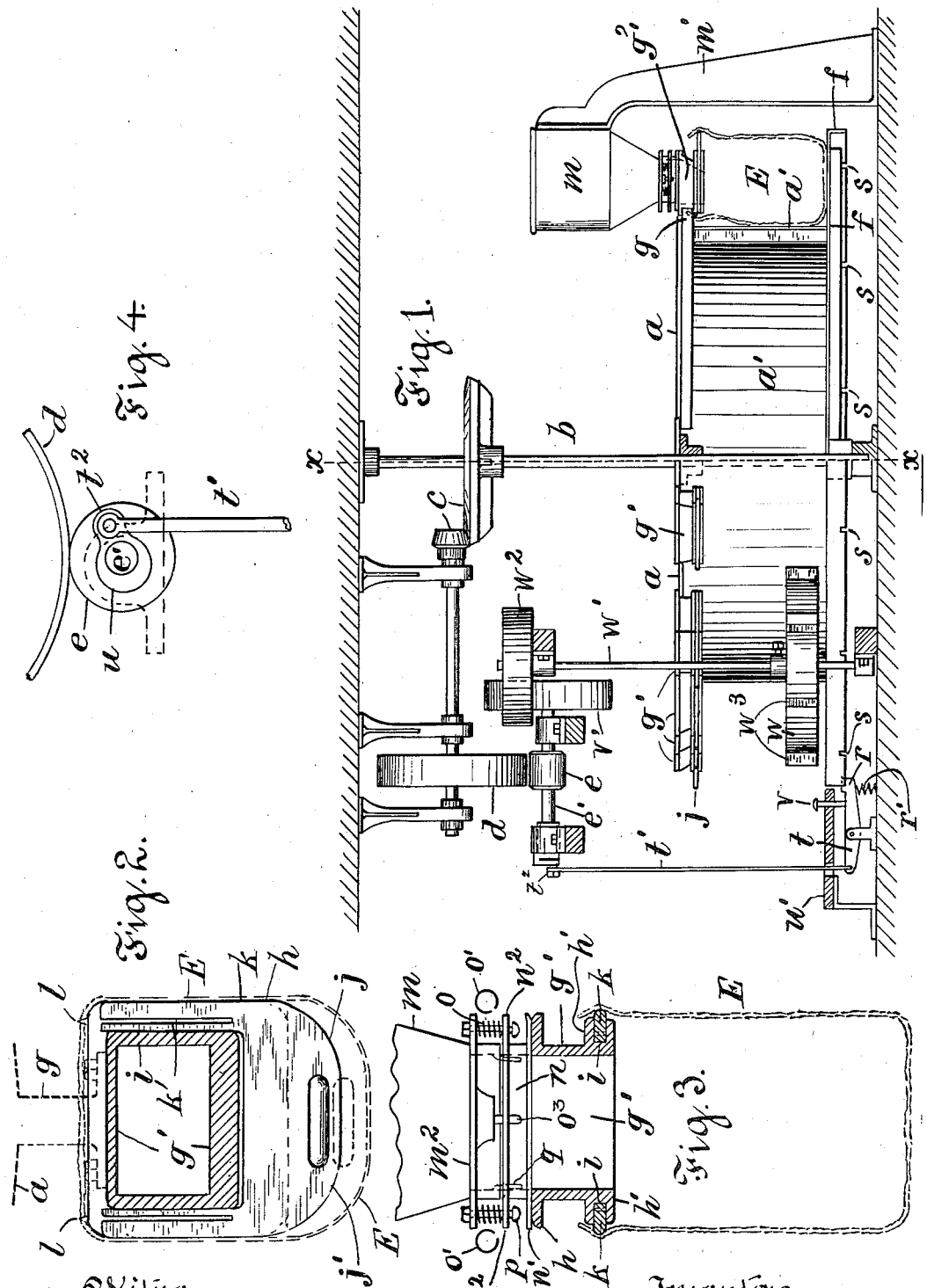
Inventors.
George R. King,
Samuel W. Fancher, per
Thomas S. Crane, Atty.

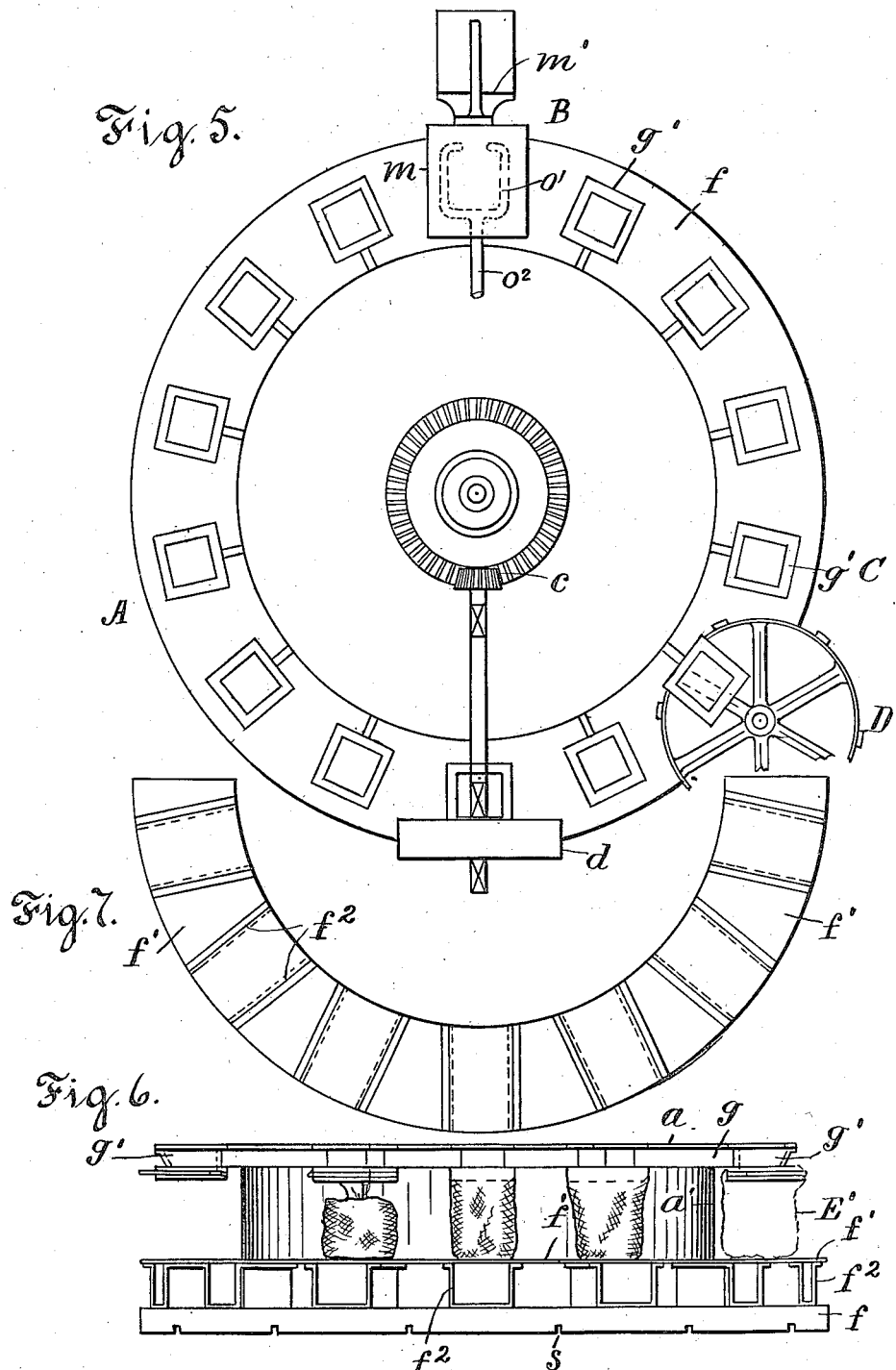

UNITED STATES PATENT OFFICE.

GEORGE R. KING, OF WEST NEW BRIGHTON, AND SAMUEL W. FANCHER, OF NEW BRIGHTON, NEW YORK, ASSIGNORS TO J. B. KING & COMPANY, OF NEW YORK, N. Y., A CORPORATION OF NEW YORK.

BAG-FILLING MACHINE.

1,124,459.   Specification of Letters Patent.   Patented Jan. 12, 1915.

Application filed February 5, 1914. Serial No. 816,698.

*To all whom it may concern:*

Be it known that we, GEORGE R. KING, residing at Manor road, West New Brighton, Richmond county, and State of New York, and SAMUEL W. FANCHER, residing at 149 Second street, New Brighton, Richmond county, and State of New York, both citizens of the United States, have invented certain new and useful Improvements in Bag-Filling Machines, fully described and represented in the following specification and the accompanying drawings, forming a part of the same.

The present invention relates to an apparatus for filling sacks or bags having an open mouth, and it consists of a machine having a series of filling-funnels carried by a turntable with special means for snugly fitting the flat top of the funnels to the bottom of the feeding-chute, a platform movable with the turntable for supporting the bag when filled and for moving it from a filling position to a suitable position for the operator to tie it or otherwise close its mouth, and means controlled by the operator for stopping and starting the movements of the turntable.

The turntable is held stationary while an operator applies a sack to one of the filling funnels, and it is then started to move such funnel to a point where the sacks are filled where it is again stopped and a sack applied to a succeeding funnel while the first-mentioned sack is filled. When the sack is filled, the turntable is started again by the operator and the filled bag is moved step by step to a point where it can be conveniently tied or closed. After the mouth of the bag is secured, the next movement of the turntable and platform brings the filled bag to a discharger, which slides it automatically from the platform, after which it may be carried by a conveyer, or removed by the operator for storage. Such operation of the machine avoids any delay in shifting the filled sack from the feeding-chute, and utilizes the time required for filling each sack in the application of the sacks to the funnels upon one side of the turntable and the tying of the filled sacks upon the opposite side.

The invention will be understood by reference to the annexed drawing, in which—

Figure 1 is an elevation of the machine with the drum in section at the right-hand side of the line $x-x$; Fig. 2 is a plan of the means for connecting the mouth of the sack to the filling-funnel; Fig. 3 is an elevation of the same with the funnel and the sack in section; Fig. 4 is a diagram of the means for operating the friction-clutch of the turntable; Fig. 5 is a plan of the turntable, with the feeding-chute and a part of the gearing for turning the turntable; Fig. 6 is an elevation of the turntable and the platform carried beneath the same, with a bag-plate supported upon the same to sustain short sacks; and Fig. 7 is a plan of one section of such bag-plate inverted.

The turntable is shown as a circular plate $a$ mounted to turn with a vertical spindle $b$ which is driven by gears $c$ and a friction-clutch consisting of a friction-pulley $d$ and friction-roll $e$. A drum $a'$ is shown extended downward from the turntable, and a circular platform $f$ provided at its lower end and projected beyond the margin of the turntable to support the sacks when filled. Arms $g$ are extended beyond the margin of the turntable to carry the filling-funnels $g'$, which are provided with upper flange $h$ and lower flange $h'$ having grooves $i$ in its opposite edges to receive a movable sack-stretcher. Such sack-stretcher has a cross-head $j$ with parallel lateral arms $k$ which are fitted to the grooves $i$. The arms are slit longitudinally at $k'$ forming an inner tongue upon each, which is bent to press elastically upon the bottom of the groove $i$ and thus hold the sack-stretcher in any position to which it is moved. The attachment of the funnels to the turntable by a narrow arm $g$, attached to each at its inner edge, exposes such inner edge of the bottom flange most fully, and thus affords the freest possible access to the pins $l$ when the operator is applying the cloth of the sacks thereto.

The rear corners of the flange $h'$ are provided with projecting pins $l$ with which the bag-mouth at its rear part can be quickly engaged, and the front part of the bag-mouth, being drawn upwardly before the cross-head $j$, can be tightened and held in open position during the filling of the bag by drawing the cross-head $j$ forwardly, as indicated by the dotted line $j'$ in Fig. 2, so as to hold the mouth of the bag fully open.

The slot $k'$ in the outer side of the flange $h'$, to which slot the cross-head $j$ of the sack-stretcher is fitted, is made deeper than any movement which the cross-head would make when pulled outwardly in stretching the mouth of the bag, and the engagement of the cross-head with the slot thus makes a close joint between the bag-mouth and the bottom of the funnel, to prevent the escape of any dust during the filling operation. The cross-head is provided with an upwardly projecting knob or handle $k^2$, which is readily grasped by the operator when moving the cross-head inward or outward.

It will be understood, as stated above, that the spring character of the arms $k$ upon the sack-stretcher serves to hold the sack-stretcher in any position to which it is moved, and thus retains it in close engagement with the mouth of the bag when it is pulled forwardly to stretch the mouth.

The platform $f$ is so arranged as to support the weight of the material in the bag when filled, and the bag-mouth is released from the funnel when the operator desires to tie it, by merely pushing the bag-stretcher $j$—$k$ inwardly and withdrawing the bag-mouth from the pins $l$. To secure the settling of the material in the sacks before their mouths are closed, it is desirable to locate the filling-point at a considerable distance upon the periphery on the turntable from the point where the mouths of the sacks are tied or secured; the step by step movement of the turntable, and platform which supports the bags, serving to jolt the bag repeatedly and thus settle the material therein before the bag reaches the position for tying. Such distance is readily obtained by suitably locating the feeding chute at a considerable arc upon the circumference of the turntable from the point where the mouths of the bags are closed and secured.

In Fig. 5, A designates the point where the bags would be attached to the funnels, B the point where the feeding-chute would be located, C the point where the bags may be tied, and D the point where they would be discharged from the supporting-platform $f$, the space between the points B and C embracing four of the funnels, and thus securing four jolts of the bag at successive stoppages of the turntable, while shifting the bag from the hopper to the tying point C. A considerable space is desirable between the feeding-chute and the discharge. The feeding-chute $m$ is shown supported over the path of the funnels by means of a stand $m'$, and in practice a weighing device is required for supplying weighed charges of material to the feeding-chute for delivery to the bags, but such weighting apparatus is not shown herein, as it forms no part of the present invention, which includes only the means for carrying the bags to the filling-device and to a convenient point for tying or manually securing their mouths before their discharge from the machine. The bottom of the feeding-chute is provided with a spring-collar $n$ having a flange $n'$ adapted to slide over the flange $h$ of the funnel, and having an upper flange $n^2$ pressed elastically by springs $o$ fitted between the same and a flange $m^2$ upon the hopper. The flange $n'$ is provided with guide-pins $o'$ fitted through holes in the flange $n^2$, and the yielding of the collar $n$ under the pressure of the springs $o$ is restricted by heads $p$ upon bolts inserted through the collars $m^2$ and $n^2$. The flange $n'$ is thus held normally close to the tops of the funnels as they approach the same, and is pushed slightly topward by each funnel as it is centered beneath the chute, thus forming a tight joint with the funnel, and preventing the escape of material at such point. A sleeve $q$ is shown extended from the bottom of the chute within the collar $n$, to prevent any leakage of material at the joint of such neck and collar.

The turntable is intermittently moved at the pleasure of the operator; allowing sufficient time between such movements for one operator to connect the bags with the funnels and another operator to tie the bags while upon the platform $f$, and the stoppage of the turntable, when each funnel is centered beneath the chute $m$, is effected by a latch $r$ adapted to engage a notch $s$ in the margin of the platform when each of the funnels is thus adjusted. The latch is formed upon the end of a lever $t$ which is connected by the rod $t'$ and crank $t^2$ with an eccentric sleeve $u$ in which the axle $e'$ of the friction-roll $e$ is journaled. The turning of the eccentric sleeve by the crank $t^2$ forces the friction-roll upward against the pulley $d$. The lever is shown with a spring $r'$ to press the latch into the notches $s$, and is located beneath a platform $u'$ upon which the operator would stand, and a push-pin $v$ is extended from the lever through the platform, and pressure from the operator's foot acts to simultaneously detach the latch $r$ from the notch $s$ in the platform, and to press the friction-roll $e$ against the pulley $d$ to rotate the drum. The roll-shaft $e'$ is continuously rotated by a driving-pulley $v'$, and the operator may thus turn the table to the desired point, and upon removing his foot from the push-pin the latch $r$ engages another notch in the platform and centers the next funnel beneath the hopper. The operator thus controls both the stopping and starting of the turntable, as he continues the movement of the table as long as desired by maintaining the pressure of his foot upon the push-pin, and then permits the turntable to be arrested by the latch $r$ by removing the pressure upon the push-pin. It is obviously immaterial whether the precise means shown herein be used for the operator to stop and start the turntable at pleasure. The platform is adapted to contact with the bottom of the bag when the latter is filled with material, and thus hold the mouth of the bag in connection with the funnel until disengaged by the operator at the tying-point C.

The support of the bag upon the platform holds it in a convenient position for the operator to tie when detached by him from the funnel, and the machine is provided with a discharger immediately adjacent to such tying-point, which pushes the tied bags successively from the platform. Such discharger is shown as a wheel $w$ mounted upon a vertical shaft $w'$ and continuously rotated by a pulley $w^2$ and having blocks $w^3$ upon its margin adapted to engage the sides of the bag when pressed toward it by the rotation of the platform, and slide the bag laterally from the platform. When thus discharged, the bags may be received by a traveling belt and conveyed to any desired point, or may be transported to any point by hand.

The platform $f$ is shown constructed at a suitable distance below the funnels to support sacks E of maximum size, and where it is desired to fill shorter sacks E', a block-plate $f'$ made in sections, as shown in Fig. 7, to fit over the platform, as shown in Fig. 6, is applied thereto and supported by blocks $f^2$ of height to sustain the plate $f'$ at the desired point. The drum $a'$ is preferably extended between the turntable $a$ and the platform $f$, to contact with the inner side of the bags, as shown in Fig. 1, and thus support them laterally during their movement to the tying-point; and, if desired, the primary platform $f$ may be made adjustable vertically upon the drum so that it can be set at any point required below the funnels.

One of the essential features of the invention is the provision of a circular platform movable with the turntable to support the bottom of the bag in shifting the same, after it is filled to a convenient point for tying, its contact with the bottom of the bag serving to jolt the bag, as the funnels are stopped and started in their movement from the filling-point to the point for closing and securing the bag-mouth. The funnels are carried upon the turntable by narrow arms $g$ so as to afford the freest possible access to the pins $l$ when the operator is applying the mouth of the sack thereto. The pull upon the mouth of the sack, when drawing the crosshead of the sack-stretcher forward, retains the cloth in firm engagement with the pins during the filling operation, the spring-tongue upon each of the arms $k$ serving to hold the sack-stretcher in its adjusted position during the filling of the bag, but permitting the operator to instantly release the mouth of the bag from the funnel when it is desired to tie or secure such mouth.

The operation of the machine may be carried on just as rapidly as the bags can be filled, as the mouths of the bags are all tied or secured at the same point so that the operator can attend to each as soon as it reaches his position, the empty bags being also secured to the funnels during the stoppage of the funnels beneath the feeding-chute. The chute is referred to herein as the means for filling the bags, as it delivers the material to the funnel for that purpose, and it is immaterial by what means the material is supplied to the chute in suitable charges.

It will be observed that the device which moves the sacks successively to the chute and tying-point has no moving parts, but that the funnels and the platform which support the filled bags are attached rigidly to the intermittently rotating shaft $d$, and the only moving element which coöperates therewith is the discharging wheel $w$; and such parts are not liable to derangement as they merely rotate in the performance of their functions. A suction-pipe $o'$ is shown in section in Fig. 3, encircling the flange $m^2$ and slotted or perforated on the side next the flange so as to draw off any dust which may escape around the joint of the chute and funnel during the filling of the sack. This pipe $o'$ is shown in dotted lines below the hopper $m$ in Fig. 5, with a branch $o^2$ extending therefrom for connection to a suction fan or pump. By this means the diffusion of dust is wholly prevented at the filling point.

At the present time means are in use for manually securing a wire tie upon the neck of the bag which can be done in less time and at less expense than many other modes of fastening the bag, and the present construction is especially adapted to fill the bags and present them at a convenient point for such manual application of the tie to the bag-neck before it is discharged from the machine, as it would not be desirable to handle the bags apart from the machine before the necks were secured.

Having thus set forth the nature of the invention what is claimed herein is:

1. In a bag-filling machine, the combination, with a turntable carrying a series of flat-top filling-funnels having means for attaching sacks thereto, of a flat-bottomed feeding-chute supported over one edge of the turntable to fit the flat tops of the funnels successively for filling the sacks with suitable charges of material, a driving-shaft, and a detachable clutch for connecting the same with the turntable, means actuated by the operator for temporarily engaging such clutch to turn the turntable, and a latch controlled by the operator for stopping the table when one of the funnels is beneath the chute.

2. In a bag-filling machine, the combination, with a turntable carrying a series of flat-top filling-funnels having means for attaching sacks thereto, of a feeding-chute having a yielding flat-bottom to slide elastically over the filling-funnels in succession, a platform movable with the turntable to support the weight of the bag while securing its neck, and means controlled by the operator for intermittently turning the turntable to shift each sack step by step from the filling-point to a suitable point for securing the neck of the bag.

3. In a bag-filling machine, the combination, with a turntable carrying a series of flat-top filling-funnels having means for engaging the sacks therewith, of a flat bottomed filling-chute supported over one edge of the turntable to slide over the flat tops of the funnels successively, a drum projected downwardly from the turntable, a circular platform carried by the drum below the funnels to support the weight of the sack while securing its neck, means controlled by the operator for shifting the funnels and bags step by step from the filling point to a suitable point for securing the neck of the sack, and a discharger operating continuously, to slide the filled sacks in succession laterally from the said platform.

4. In a bag-filling machine, the combination, with a turntable carrying a series of filling-funnels having means for attaching sacks thereto, of means for filling the sacks through the funnels, a circular platform rotatable with the turntable at a suitable distance below the funnels to support sacks of maximum height, and a block-plate fitted to rest upon such circular platform to support sacks of lesser height.

5. In a bag-filling machine, the combination, with a turntable carrying a series of filling-funnels having each a smooth level flange upon the top and means for attaching the sacks to the funnels, of a feeding-chute fixed over one side of the turntable and having upon the bottom a spring-collar with a flat flange adapted to slide over the top-flange of the funnel and make a tight joint therewith during the filling operation.

6. In a bag-filling machine, the combination, with a turntable carrying a series of filling-funnels, of a feeding-chute supported over the turntable to engage such funnels, each funnel having a smooth level flange upon the top to engage the chute and having projections upon its rear side to engage the mouth of a bag, and having grooves upon its opposite sides, and a sack-stretcher having a crosshead with parallel arms fitted elastically to the said grooves, and the crosshead adapted to fit within the mouth of the bag and hold its rear edge against said projections.

7. In a bag-filling machine, the combination, with a turntable carrying a series of filling-funnels having each a smooth level flange upon the top and means for attaching sacks to the funnels, of a feeding-chute fixed over one edge of the table to engage the tops of such funnels, and having a fixed flange with bolts extended downwardly therefrom carrying a movable collar with flange to slide upon the tops of the funnels, springs fitted between the fixed flange and such collar, and a sleeve extended from the bottom of the chute within the collar to prevent leakage of material at the joint.

8. In a bag-filling machine, the combination, with a turntable carrying a series of flat-top filling-funnels having means for attaching sacks thereto, of a feeding-chute having a flat bottom to slide over the filling-funnels in succession, and means supported adjacent to the joint of the chute with the filling-funnels to remove by suction any dust that escapes at such joint.

In testimony whereof we have hereunto set our hands in the presence of two subscribing witnesses.

GEO. R. KING.
SAMUEL W. FANCHER.

Witnesses:
ELMER H. GOURLEY,
ALFRED F. KING.